(12) United States Patent
Walker

(10) Patent No.: US 6,373,580 B1
(45) Date of Patent: Apr. 16, 2002

(54) METHOD AND APPARATUS FOR MULTI-DIMENSIONAL INTERPOLATION

(75) Inventor: Douglas G. Walker, Boston, MA (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/103,466

(22) Filed: Jun. 23, 1998

(51) Int. Cl.$^7$ .............................................. B41B 13/08
(52) U.S. Cl. ..................... 358/1.1; 358/525; 358/515; 358/506; 358/530; 382/167; 382/162
(58) Field of Search ..................... 358/1.9, 1.1, 525, 358/515, 530, 506, 518, 523, 524; 382/41, 162, 167; 345/418, 430, 608, 607, 606

(56) References Cited

U.S. PATENT DOCUMENTS

| | | | | |
|---|---|---|---|---|
| 4,275,413 A | | 6/1981 | Sakamoto et al. ............. 358/80 |
| 4,511,989 A | | 4/1985 | Sakamoto .................... 364/723 |
| 4,578,812 A | * | 3/1986 | Yui .............................. 382/41 |
| 5,325,217 A | * | 6/1994 | Nagler et al. ............... 358/506 |
| 5,390,035 A | * | 2/1995 | Kasson et al. .............. 358/518 |
| 5,544,052 A | * | 8/1996 | Fujita et al. ................ 364/420 |
| 5,581,376 A | * | 12/1996 | Harrington .................. 358/518 |
| 5,748,195 A | * | 5/1998 | Nin ............................. 345/431 |
| 5,943,058 A | * | 8/1999 | Nagy ........................... 345/430 |
| 5,977,977 A | * | 11/1999 | Kajiya et al. ................ 345/418 |
| 6,031,642 A | * | 2/2000 | Vondran, Jr. ................ 358/525 |
| 6,043,909 A | * | 3/2000 | Holub ......................... 358/504 |

OTHER PUBLICATIONS

Dialog OneSearch, Feb. 5, 1998.

\* cited by examiner

*Primary Examiner*—David Moore
*Assistant Examiner*—Kaveh Kianni
(74) *Attorney, Agent, or Firm*—David M. Woods

(57) ABSTRACT

The invention involves selecting a path through a multi-dimensional hyper-cube from a base vertex to an opposite corner or vertex of the hyper-cube. The path is selected by ranking the fractional components of the point or value to be interpolated. An N-dimensional interpolation is performed according to this sequence. During an interpolation a base vertex for an input color value is determined. The output value for the base vertex is accumulated. The fractional values of the input color value are sorted and ranked according to magnitude to produce an interpolation sequence. The interpolations are performed for each axis of the N-dimensions by selecting an axis for interpolation based on the order, performing an interpolation corresponding to the selected axis producing an interpolation result, and accumulating the interpolation result.

2 Claims, 2 Drawing Sheets

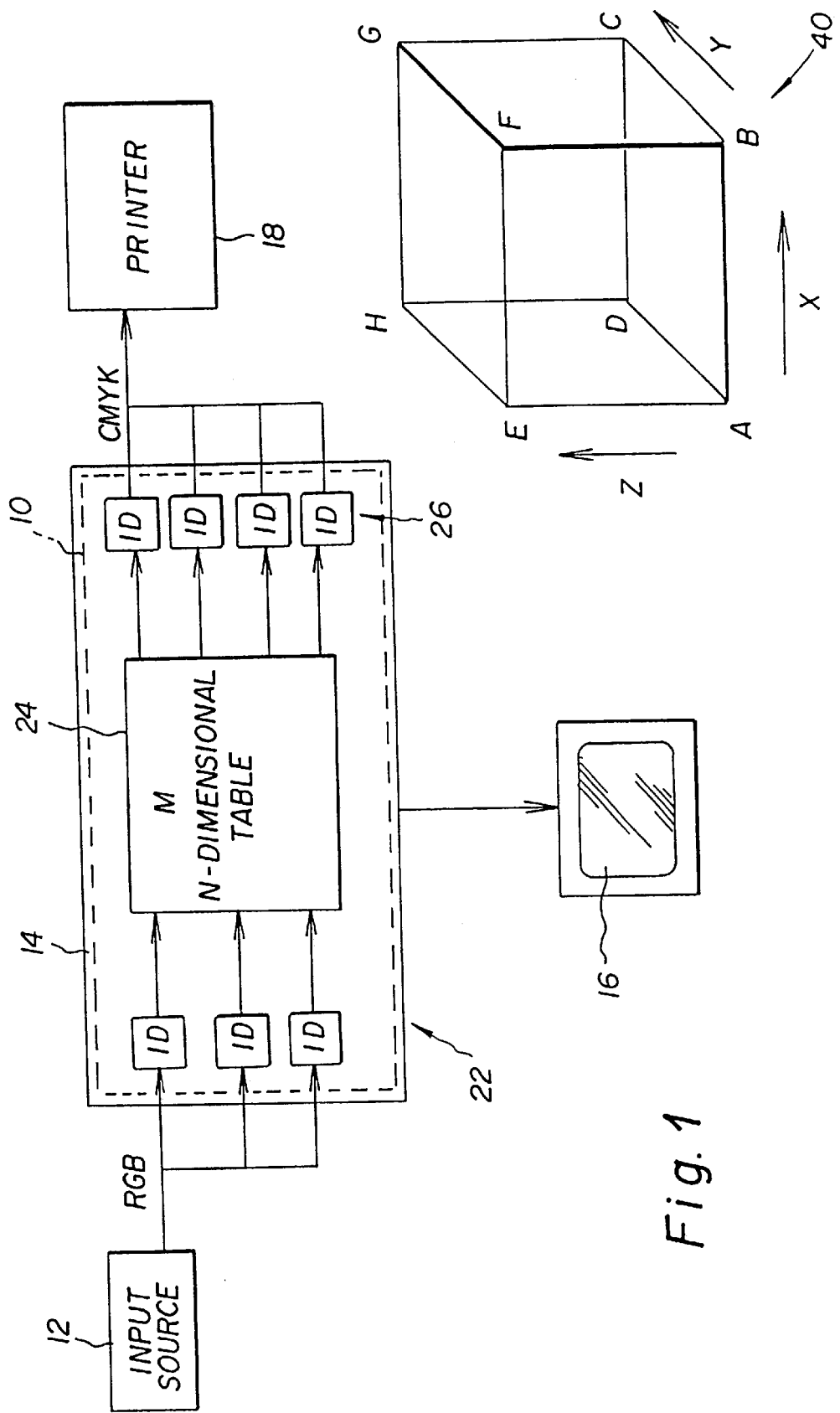

METHOD AND APPARATUS FOR MULTI-DIMENSIONAL INTERPOLATION

BACKGROUND OF THE INVENTION

1. Field of the Invention

The present invention is directed to a system that performs a multi-dimensional interpolation typically used in color processing and, more particularly, one in which the sequence of the interpolation is governed by a ranking of the fractional parts of the point or value to be interpolated.

2. Description of the Related Art

Current color management techniques are based on the use of color transforms that include multi-dimensional "grid" tables to embody a given color mapping. When processing pixel data through a color transform or when composing or combining transforms it is necessary to interpolate in the N-dimensional tables (where N is the number of input dimensions) because storing the value of the mapping for every possible input would lead to impractically large data structures. Kodak's color management module or CMM uses a linear interpolation technique to interpolate in the grid tables. A linear method can give good quality and speed characteristics. The high evaluation speed is partly a consequence of the fact that only N+1 grid points are required to perform an interpolation (other techniques such as trilinear require more points, 2^N in the case of trilinear or its higher dimensional equivalents). However, achieving the fastest evaluation speed also requires a good algorithm for determining which N+1 points to use (out of the possible 2^N in the surrounding hypercube) and determining which coefficients to use in performing the interpolation.

What is needed is a technique to determine the sequence in which coefficients are selected for interpolation.

Current linear interpolations give acceptable performance when N=4 but degrade quickly as the number of input dimensions increases. However, transformations involving more than 4 input dimensions are gradually becoming necessary. For example, processing images originating in a space designed for "Hi-Fi" printing requires between 5 and 8 input dimensions corresponding to the number of inks used.

What is needed is a technique that allows an arbitrarily high number of dimensions to be involved in interpolation and to provide accurate and fast results in such as situation.

SUMMARY OF THE INVENTION

It is an object of the present invention to provide a system that allows an N-dimensional interpolation to be efficiently performed.

It is another object of the present invention to provide a system that does not require large tables or other overhead to determine which grid coefficients or components to use in an interpolation.

It is an additional object of the present invention to provide a technique that determines the sequence of coefficients in the interpolation.

It is also an object of the present invention to provide a system which efficiently chooses which vertices to use for interpolation.

It is a further object of the present invention to provide a process that can be used regardless of the number of input dimensions or output dimensions in the interpolation.

The above objects can be attained by a system that ranks the sequence of grid point interpolations by the fractional components of the point or value to be interpolated. An N-dimensional interpolation is performed according to this sequence.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 depicts a system of the present invention.

FIG. 2 illustrates an interpolation path through a cube determined according to the present invention.

DESCRIPTION OF THE PREFERRED EMBODIMENTS

Figure 3:
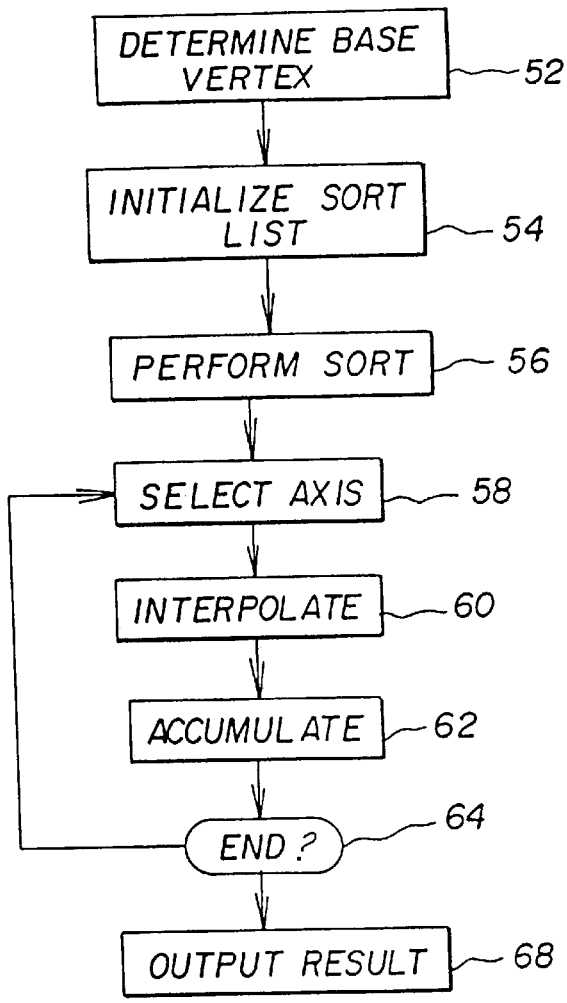
FIG. 3 depicts the flow of operations of the invention.

The present invention achieves very high speed N-dimensional interpolation performance through the use of an algorithm that requires no large tables or other overhead to determine which grid points to use or what coefficients to use in performing the interpolation. The invention involves selecting a path through the multi-dimensional hyper-cube from a base vertex to an opposite corner of the cube. This path then is used to specify the sequence of interpolation operations.

The present invention is implemented in a color management system 10, such as depicted in FIG. 1. In a typical color management system an input source 12 of an image (still or motion), such as a scanner, a storage device (like a CD ROM), a camera, a communications network, etc., provides an image to a computer 14, such as desk top or lap top type personal computer. The input image will typically be digital color values in a particular color space, such as the three-dimensional scanner RGB color space. The computer converts the color values from the input-color space into values in an output color space, such as CRT RGB for a display or CMYK for a color printer. In such a conversion several transforms may be involved to transform into and out of a device independent color space, resulting in a number of different transforms being involved. The converted color values are then provided to the target output device, such as display 16 or printer 18. As another example, a six channel input image intended for a Hi-Fi printing process may be converted to RGB space to allow it to be viewed on a CRT.

In order to transform between color spaces, several different conversions occur using one-dimensional and N-dimensional tables. The N dimensional tables are sometimes called grid tables. N, one-dimensional input tables 22 perform scaling and other functions and provide modified input color values to M,N-dimensional grid tables 24. The inputs to the grid tables 24 typically include an integer part and a fractional part. The grid tables 24 are provided to convert the N input color values, where N is typically 3 or more in color processing, from one color space into M output color values possibly in another color space, where M is typically 3 or more in color processing. M, one-dimensional output tables 26 perform any necessary additional shaping.

Due to memory space requirements the grid table 24 typically does not include a table entry for each input and output value. As a result, the table is somewhat sparsely populated. This requires that the grid table values be interpolated when the input value does not correspond to a grid point. For example, if the input value for device1 XYZ= (1.7,3,5) and the grid points fall on even integer values, the output value for device2 must be interpolated for X=1.7. To do this the corresponding output grid values for device2 for X=1 and X=2 need to be obtained. If the corresponding output grid values for device2 are 10 and 20, respectively, then a linear interpolation will result in the first component of the output value being 17.

An important aspect of the present invention is the determination of a path through the N-dimensional cube from a base vertex to a vertex on an opposite corner of the cube. This path can then be used to perform an efficient interpolation. This path determines the sequence of the interpolation. A simple example using a three-dimensional cube 40 where N is 3 and M is 1, as depicted in FIG. 2, will first be discussed. In this cube 40 the base vertex is vertex A and the opposite vertex is vertex G. With three dimensions and eight vertices A–H there are 3! possible shortest paths along the edges of the cube from A to G resulting in six possible paths in this example.

Assume that the input value is X,Y,Z=(5.7,6.3,3.4). To determine the path through the cube the invention first isolates the fractional parts, such that $X_f,Y_f,Z_f$=(0.7,0.3, 0.4). These fractional parts are then ranked from largest to smallest such that the rank $X_r,Y_r,Z_r$=(1,3,2). This ranking governs the path through the cube. As depicted in FIG. 2 by the thick line the path, as specified by the ranking, is A-B-F-G. The path determines which N+1 vertex subset of the $2^N$ vertices will be used and how they are combined with the fractional values. Based on this path, during the interpolation process, the interpolation for the x-axis is performed first, followed by the z-axis which is followed by the y-axis. Note that the interpolations along the path need not be done sequentially, but could be performed in a non-sequential order, such as randomly, if desired.

A typical interpolation, which is performed on a per pixel basis in a color conversion, starts with determining 52 a base vertex, as depicted in FIG. 3. This can be done in a number of different ways. For example, the base vertex can be determined by rounding the input value down to the nearest integer or truncating the fractional part to leave only the integer part. In the example previously mentioned the base vertex of the XYZ value discussed above would be (5,6,3). Because the input table processes that are performed in a color management system already provide the integer and fractional parts of the input value, it is preferred that the integer and fractional parts already produced be used. The opposite corner or vertex can be obtained by adding one to all of the axial components of the base vertex. For example, the opposite vertex or corner would be (6,7,4). The other corners of the cube can be obtained by adding one to each of the axial components at a time, that is, the corners are (5,6,4), (5,7,3), (5,7,4), (6,6,3), etc.

Next, a sort list for the ranking step is initialized 54 which involves isolating the fractional parts of the input value. The fractional values are then ranked. This can be done in a number of different ways, however, the preferred approach is to perform a network sort 56 as described in Practical Algorithms for Programmers, by Binstock and Rex, Addison-Wesley, 1995, incorporated by reference herein.

The system then effectively enters a loop in which the interpolations are performed and accumulated. The first step of the loop is to select 58 the axis on which interpolation is to be performed. The interpolation is then performed 60 and the interpolated value is accumulated 62. Note that in the first cycle of the loop the base vertex output value is loaded into the accumulator. If the last interpolation has not been performed 64, the system returns for a selection of the next axis for interpolation. For example, if the interpolation is for a ten dimensional hyper-cube, the loop would be executed ten times. Otherwise, the result is output 68.

Figure 4:
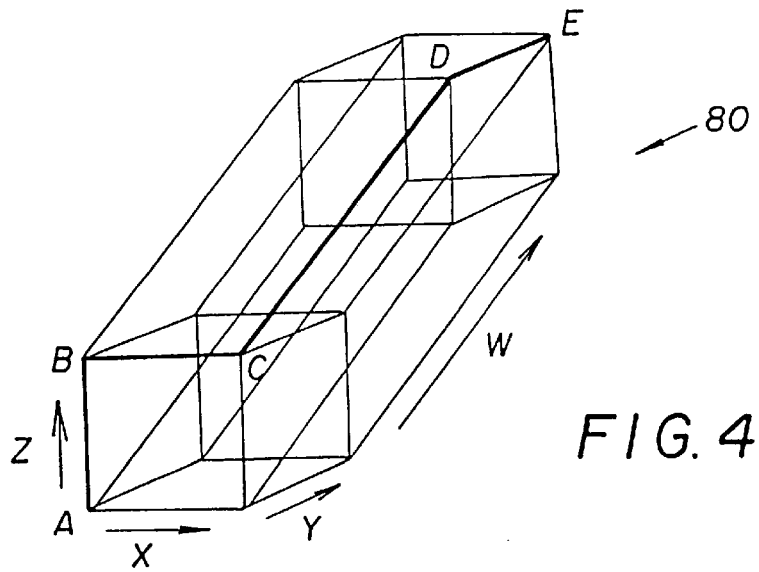
FIG. 4 depicts an interpolation path through a hypercube according to the present invention.

To illustrate a more complex example, a four dimensional input value will be interpolated. In this example, a hyper-cube 80 with four dimensions where N equals 4 and M equals 1 will be used, as depicted in FIG. 4. Assume that the input value is XYZW=(3.7,3.0,4.9,7.2). This results in the ranking $X_r,Y_r,Z_r,W_r$=(2,4,1,3). This produces a path through the cube 80 of A-B-C-D-E, as illustrated by the heavy line in FIG. 4. Based on this path, the interpolations are z-axis, x-axis, w-axis and y-axis. During the interpolation, the accumulator ACC starts with the output value A and the values B–E correspond to the output values for the corresponding grid points. At the start $$ACC=A \qquad (1)$$

In the first cycle $$ACC=A+(B-A)dz \qquad (2)$$

where dz=0.9.
In the second cycle $$ACC=A+(B-A)dz+(C-B)dx \qquad (3)$$

where dx=0.7.
In the third cycle $$ACC=A+(B-A)dz+(C-B)dx+(D-C)dw \qquad (4)$$

where dw=0.2.
In the final cycle $$ACC=A+(B-A)dz+(C-B)dx+(D-C)dw+(E-D)dy \qquad (5)$$

where dy=0.0.
Note that this equation can be rearranged to:

$$ACC=A(1-dz)+B(dz-dx)+C(dx-dw)+D(dw-dy)+Edy \qquad (6)$$

The interpolations of equations 5 and 6 are linear interpolations and other interpolation methods could be used instead. Equation 5 represents an embodiment which for convenience is called a "difference of vertices" method while equation 6 represents an embodiment called a "difference of fractions" method. The C code provided in the Appendix provides a more detailed description of the process of the invention and supports M output values. The two embodiments are presented, both giving the same results. The "difference of vertices" method requires more adds but uses fewer multiplies than the "difference of fractions" method and results in a different code implementation as shown in the Appendix. Since on many microprocessors multiplies can be much more time consuming than adds, the difference of vertices method can be faster even though the total number of operations is higher.

The process of the present invention can be stored on a storage medium, such as a floppy disk, and provided to a color management system user for execution within a color management system. The process can also be transmitted over a network, such as the Internet, to a user rather than being distributed using a storage medium.

By providing an algorithm with the least overhead through avoiding the use of large tables or complicated decision making processes, this technique provides faster interpolation speed with no loss of quality when compared to other multi-dimensional interpolation methods.

The present invention has been described with respect to using the invention for interpolations in color processing. The invention could also be used for finite element analysis, volume imaging or other situations where interpolations in multiple dimensions are involved. The invention has been described as being suitable for implementation in a personal computer type machine. The invention could also be implemented in specialized hardware such as a parallel processor or a customized chip particularly because of the low overhead involved in obtaining results with the invention and because of the independence of the invention form the number of dimensions involved.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

APPENDIX

```
//   The following variables should be declared and
//   initialized as described before entering the
//   following code to perform the multi-dimensional
//   interpolation.
//   All variables are integers or integer arrays.
//   N: number of input dimensions
//   M: number of output dimensions
//   sortlist:   the list of network sort comparisons
//               to be made (a function of N) this may
//               be initialized by (for example)
//               using the Bose-Neison algorithm from
//               "Practical Algorithms for Programmers"
//               by Binstock and Rex, Addison Wesley.
//   k: length of sortlist (the number of compares)
//   num_pixels: number of pixels to evaluate
//   pixel:      a nummber pixels by Narray ofthe input colors
//               to evaluate
//   integer:    N-element vector to hold the integer
//               components of interpolant
//   frac:       N-element vector to hold the fractional
//               components of interpolant
//   rank:       N-element vector with indices that will
//               be used to rank fractional the elements
//               of frac by magnitude
//   grid_table: M, N-dimensional arrays storirig the
//               interpolation tables, these are
//               addressed in the code below as
//               2-dimensional arrays with the first
//               dimension the concatenated index
//               for the N input dimensions and the
//               second dimension is for the M
//               output channels.
//   frac_max:   constant containing the largest value
//               representable by frac, generally,
//               (2 ^ fractional bit depth) −1
//   offset:     N-element vectorcontaining the no. of
//               grid_table elements between consecutive
//               values in the given dimension
//   input_table: QxN array of structures containing
//               the input lookup tables, where
//               Q = 2 ^ (input precision/channel/pixel)
//               and each entry in the table is a
//               structure containing the integer and
//               fraction parts of the interpolant.
//               The integer part is scaled by the
```

APPENDIX -continued

```
//               offset value for that channel so
//               that the base vertex may be
//               calculated by simply summing these
//               values, thus saving N multiplies
//               per pixel.
//   (Indexing is zero-based in the C language)
//   Here is the first embodiment that uses the
//   "difference of vertices" method
//   Do the following once for each pixel
for (p=O; p<number_pixels; p++)   {
// look-up in input table
    for (i i<N; i++)
        integer[i] =
            input_table[pixe] [p] [i]] [i] .integ;
        frac[i] = input_table[pixel [p] [i]] [i].frac;
    // re-initialize this every pixel
        rank[i] = i;
    }
// rank fraction components, largest to smallest
//        (use network sort)
    for (i=0; i<k; i++)   {
        a = sortlist [i] [0];   b = sortlist [i] [1]
        if (frac[a] < frac[b])
        // swap elements
            tmp = frac [a]; frac [a] = frac [b]
            frac[b] = tmp; tmp = rank[a];
            rank[a] = rank[b]; rank[b]= tmp
        }
    }
// interpolate using difference of vertlces method
index = 0;
    // calculate address of base vertex
    for (i=0; i<N; i++)   {
        index += integer[i]
    }
// fetch base vertex and start accumulating result
// (loop over output channels)
    for (j=0; j<M; j++)   }
        vertex = grid_table[index] [j]
        result[j] = vertex;
        prev_vertex[j] = vertex;
    }
// accumulate the next N terms
    for (i=0; i<N; i++)   {
        index += offset[rank[i]];
        for (j=0; j<M; j++)   {
            vertex = gridtable[index] [j]
            result[j] += frac[i] *
5 (vertex - prev_vertex[j])
            prev_vertex[j] = vertex;
        }
    }
// scale result to proper precision via add and
// right shift and look-up in output tables
        .... (these are well-known in the art)
}
// Here is an aiternative embodiment that uses the
// "difference of fractions" method
// Do the following once for each pixel
for (p=0; p<num_pixels; p++)   {
// look-up in input table
    for (i=0; i<N; i++)   {
        integer [i] =
5 input_table[pixel[p] [i]] [i] .integ;
        frac[i] = input_table[pixel[p][i]] [i] .frac;
    // re-initiaiize this every pixel
        rank[i] = i;
    }
// rank fraction components, largest to smallest
//        (use network sort)
    for (i=0; i<k; i++)   {
        a = sortiist [i] [0];   b = sortlist [i] [1]
        if (frac[a] < frac[b])   {
        // swap elements
            tmp = frac [a]; frac [a] = frac [b];
            frac[b] = tmp; tmp = rank[a];
            rank[a] = rank[b]; rank[b] = tmp;
```

APPENDIX

```
        }
    }
    // interpolate using difference of fractions
        index = 0;
        // calculate address of base vertex
        for (i=0; i<#; i++)  {
            index += integer[i];
        }
    // fetch base vertex and start accumulating result
    // (loop over output channels)
        for (j=0; j<M; j++)  {
            vertex = grid_table[index] [j];
            result[j] = (frac_max - frac[0])
    * vertex;
        }
    // accumulate the next N-1 terms
        for (i=0; i<N-1; i++)  {
            index += offset[rank[i]];
            dfrac = frac [i]- frac [i+1]
            for (j=0; j<M; j++)  {
                vertex = gridtable[index] [j];
                result[j] += dfrac * vertex;
            }
        }
    // accumulate last term
        index += offset[rank[N-1]];
        for (j=0; j<M; j++)  {
            vertex = gridtable[index] [j]
            result[j] += frac[N-1] * vertex;
        }
    // scale result to proper precision via add and
    // right shift and look-up in output tables
        .... (these are well-known in the art)
}
```

REFERENCE NUMBER LIST

A–G Vertices
10 system
12 Input source
14 Computer
16 Display
18 Printer
22 Input table
24 Grid table
26 Output table
40,80 Cube
52–68 Operation steps

What is claimed is:

1. A method of color value interpolation in a precomputed N-dimensional hypercube array of tabulated color values, comprising:

separating an input color value into integer and fractional components;

using the integer color value components for selecting a hypercube from the hypercube array with the hypercube having a base vertex with a base vertex color value;

using the fractional color value components for selecting a path for an N-dimensional color value interpolation, where the path begins at the base vertex, where the path comprises N segments between vertices of the hyper cube, where the path is dependent upon the input color value, and where each path segment corresponds to a fractional color value component;

calculating a set of N differences between consecutive hypercube vertices along the path;

multiplying each difference by the fractional component corresponding to the segment of the path used to calculate the difference; and accumulating the multiplied differences and adding the accumulated, multiplied differences to the base vertex color value to obtain a result of the color value interpolation.

2. A method of color value interpolation in a precomputed N-dimensional hypercube array of tabulated color values, comprising:

separating an input color value into integer and fractional components;

using the integer color value components for selecting a hypercube having a base vertex from the hypercube array;

using the fractional color value components for selecting a path for an N-dimensional color value interpolation, where the path begins at the base vertex, where the path comprises N segments between vertices of the hypercube, where the path is dependent upon the input color value, and where each path segment corresponds to a fractional color value component; and multiplying the base vertex color value by, a quantity, one minus a largest fractional color value;

multiplying color values of the next N−1 hypercube vertices along the path by a difference between the fractional color value component corresponding to the path segment entering each vertex and the fractional color value component corresponding to the path segment leaving each vertex; and multiplying the color value of a last hypercube vertex along the path by the smallest fractional color value component; and accumulating the multiplied values to obtain a result of the color value interpolation.

* * * * *